(12) United States Patent
Tognetti et al.

(10) Patent No.: US 7,585,367 B1
(45) Date of Patent: Sep. 8, 2009

(54) WHEEL DRESSING APPLICATOR

(75) Inventors: David L. Tognetti, Howell, MI (US);
Mark D. Morin, Plymouth, MI (US);
Michael J. Belanger, Novi, MI (US)

(73) Assignee: Belanger, Inc., Northville, MI (US)

( * ) Notice: Subject to any disclaimer, the term of this patent is extended or adjusted under 35 U.S.C. 154(b) by 0 days.

(21) Appl. No.: 12/062,996

(22) Filed: Apr. 4, 2008

(51) Int. Cl.
*B05C 1/06* (2006.01)

(52) U.S. Cl. .................. 118/221; 118/225; 118/255; 118/264; 118/266; 118/304

(58) Field of Classification Search .............. 118/264, 118/266, 304, 221, 225, 255; 15/230.14, 15/53.4, 97.3, 97.1, 103.5, 230.16, 230.19; 134/45, 123; 451/178, 541, 542, 543
See application file for complete search history.

(56) References Cited

U.S. PATENT DOCUMENTS

| 911,702 | A | * | 2/1909 | Carroll | 15/179 |
| 4,192,036 | A | * | 3/1980 | Heymann | 15/53.3 |
| 5,318,629 | A | * | 6/1994 | Raque et al. | 118/18 |
| 6,461,429 | B1 | | 10/2002 | Gorra | |
| 6,461,685 | B2 | | 10/2002 | Gorra | |
| 6,936,104 | B2 | | 8/2005 | Gorra | |
| 2008/0047085 | A1 | * | 2/2008 | Kolarevic et al. | 15/179 |

* cited by examiner

*Primary Examiner*—Laura Edwards
(74) *Attorney, Agent, or Firm*—Young Basile

(57) ABSTRACT

A tire dressing applicator which reduces wear on the applicator elements comprising a plurality of foam rollers having broad outer circumferential surfaces mounted in parallel coaxial adjacent relationship on a support shaft adjacent a path of tire travel. Tire dressing is dispensed onto the outer circumferential surfaces on demand and an actuator is provided for incrementally rotating the shaft and the rollers in unison therewith as necessary. However, a frictional engagement between the rollers and the shaft permits individual rotation of the rollers relative to the shaft during engagement with a tire sidewall.

7 Claims, 5 Drawing Sheets

WHEEL DRESSING APPLICATOR

FIELD OF THE INVENTION

This invention relates to tire dressing applicators and more particular to a tire dressing applicator in which wear on the applicator elements due to tire contact is reduced.

BACKGROUND OF THE INVENTION

Commercial car wash operations often include optional extra cost features such as undercarriage wash, rust inhibitor application and tire dressing application. One known method of tire dressing applicator uses an elongate pad of foam material which can be filled with tire dressing by means of internal nozzles and brought into a position where the pad engages the sidewall of the tires of a passing vehicle. Such an applicator is shown in U.S. Pat. Nos. 6,936,104, 6,461,685 and 6,461,429.

In these devices, once the pad is positioned adjacent the path of tire movement, the pad remains stationary. Therefore, there is a strong scuffing or brushing interaction between the tire sidewall and the outer pad surface. This interaction can give rise to rapid pad wear and a requirement for frequent replacement.

SUMMARY OF THE INVENTION

The present invention provides a tire dressing applicator using one or more foam applicator elements in the form of rollers with relatively wide outer circumferential surfaces mounted on a support shaft in such a way that the roller or rollers turn or rotate in unison with the shaft but can also rotate independently of the shaft when engaged by a tire.

In the preferred embodiment, the applicator rollers are made of a relatively low-density, non-reticulated foam material such as polyurethane or a synthetic foam rubber and are formed with relatively wide outer circumferential surfaces. The foam roller or rollers are mounted coaxially on spool-like bearing elements (called "hubs") which, in turn, are placed on a shaft of, for example, stainless steel or hard plastic. The hubs and rollers are constructed in such a way that portions of the foam rollers project or "bulge" through windows formed in each of the hubs thereby to contact the shaft surface to provide a higher friction grip which causes the roller to tend to rotate with the shaft. In addition, the end flanges of the hubs abut one another in the axially side-by-side relationship, providing a thrust bearing action which promotes the ability of one roller element to rotate relative to the next adjacent roller element during tire engagement.

The invention further comprises an actuator for providing incremental rotation of the shaft on command. The actuator used in the illustrative embodiment is an incremental device which, when operated, rotates the shaft and the rollers in unison therewith through an angle of approximately 90°, this angle being given primarily for purposes of illustration, as other angles of lesser or greater degree can be used. Tire dressing is applied to the outer circumferential surfaces of the rollers by means of dispensers which are located above the rollers and are operated on command by suitable valves and other appropriate plumbing as will be apparent to those of ordinary skill in the art.

Finally, the entire system may be mounted on a positioning bar which allows the applicator roller or group of rollers to be brought into proximity with a tire travel path as well as retracted therefrom in cases where the application of tire dressing to the wheel is not selected by the customer.

It has been found that the present invention provides a number of advantages including reduced wear on the applicator wheels with a resulting reduction in down time for replacement of applicator elements in the system. For a complete understanding of the features and advantages of the invention, the reader is directed to the following specification which is to be taken with the accompanying drawings.

DETAILED DESCRIPTION OF AN ILLUSTRATIVE EMBODIMENT

Figure 1:
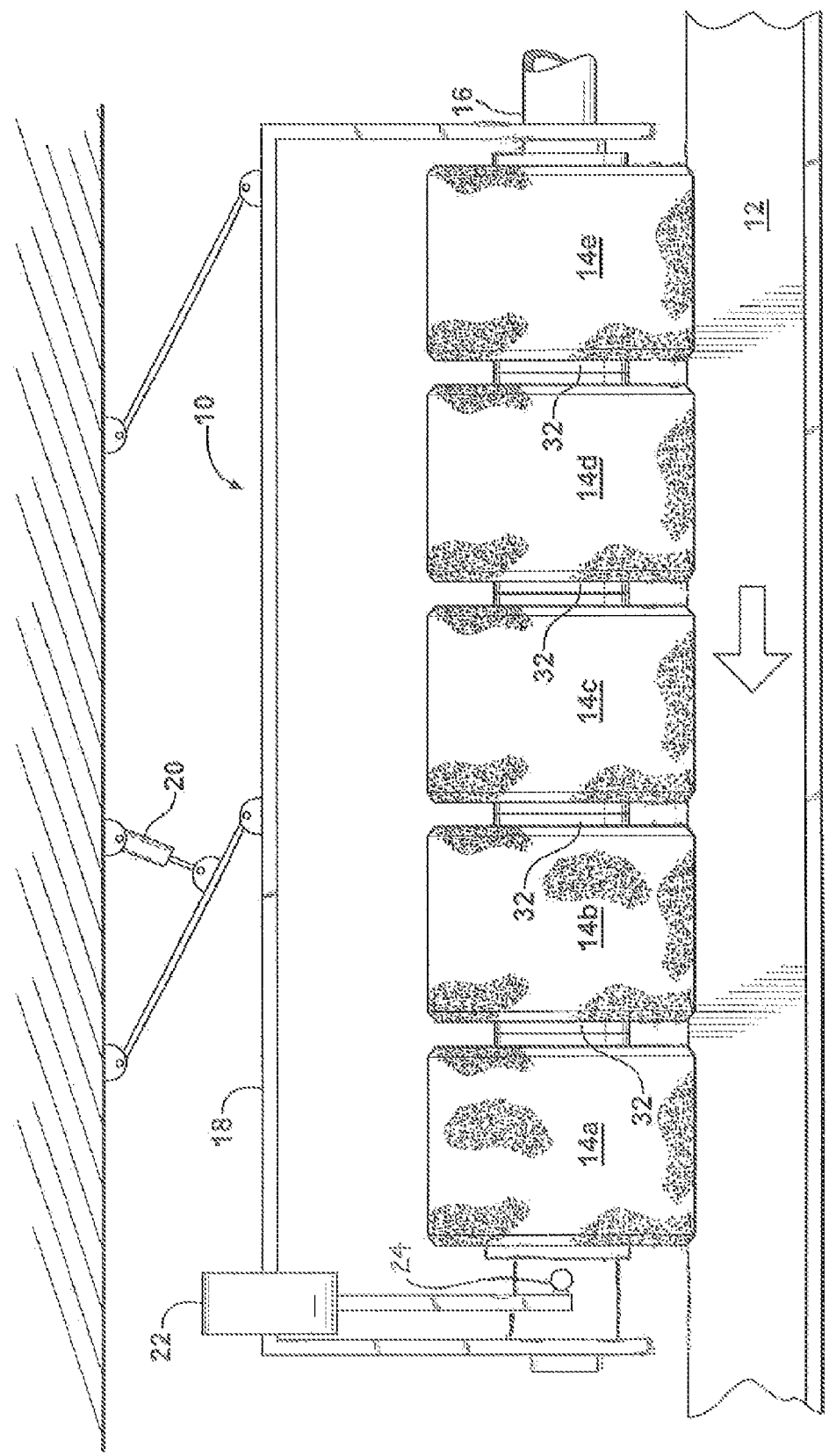
FIG. 1 is a top plan view of a tire dressing applicator system embodying the invention.

Referring now to the Figures, there is shown a tire dressing applicator system 10 located adjacent a path 12 of tire travel for a vehicle in a conveyor-type car wash installation.

The system comprises a plurality of applicator elements 14*a*-14*e* mounted in side-by-side adjacent and coaxial relationship on a shaft 16 which extends parallel to the path 12 of vehicle travel. The shaft is rotatably mounted by means of suitable bearings on a bracket 18 which can be moved rectilinearly toward and away from the tire travel path 12 by hydraulic cylinder 20.

An actuator 22 is connected to a crank-arm 24 coupled to the shaft 16 by means of a ratchet type one-way clutch 26 which allows in the actuator to rotate the shaft 16 and the elements 14*a*-14*e* in unison therewith through increments of approximately 90° on command.

Figure 2:
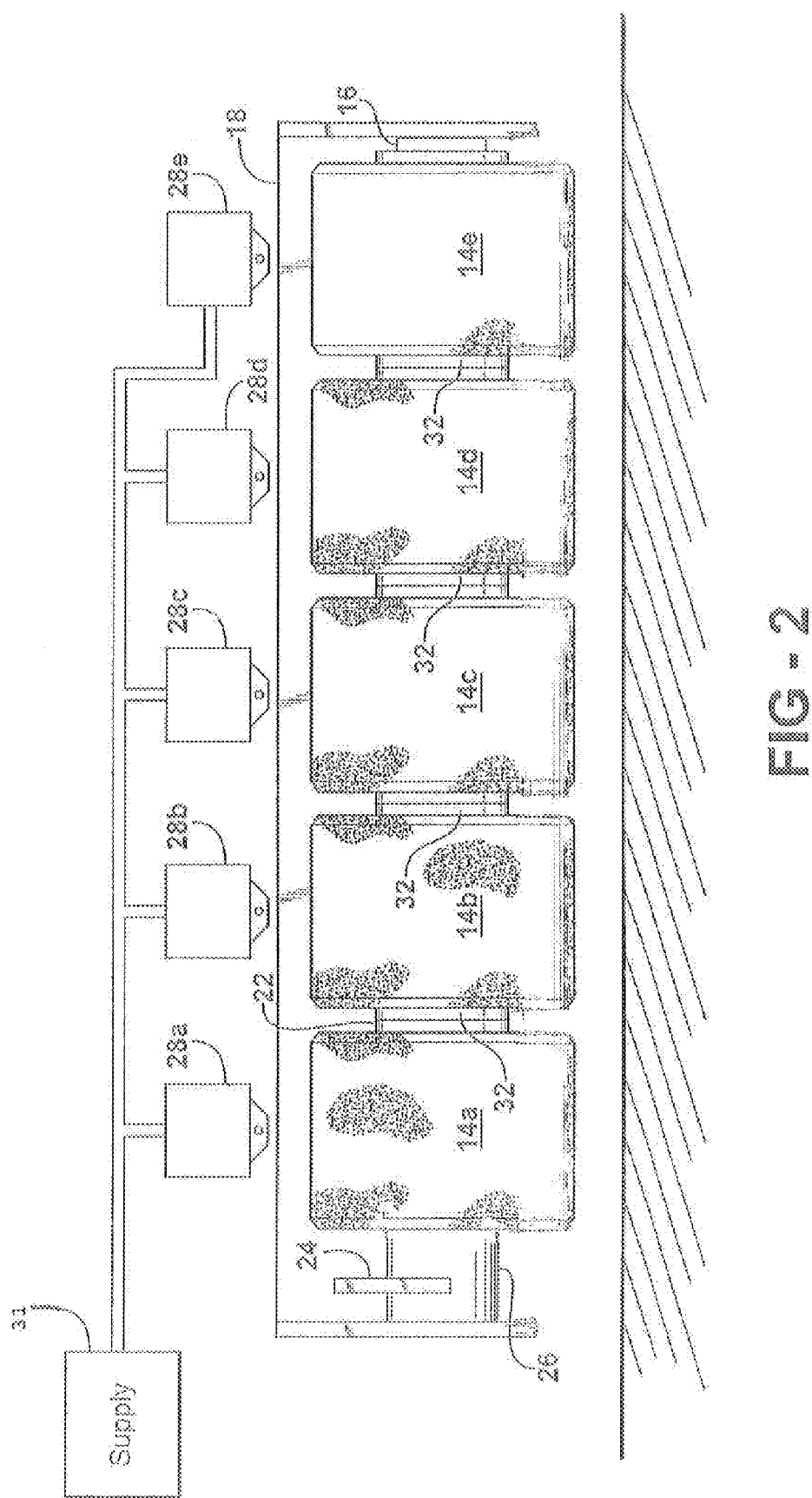
FIG. 2 is a front view of the system of FIG. 1.
Figure 3:
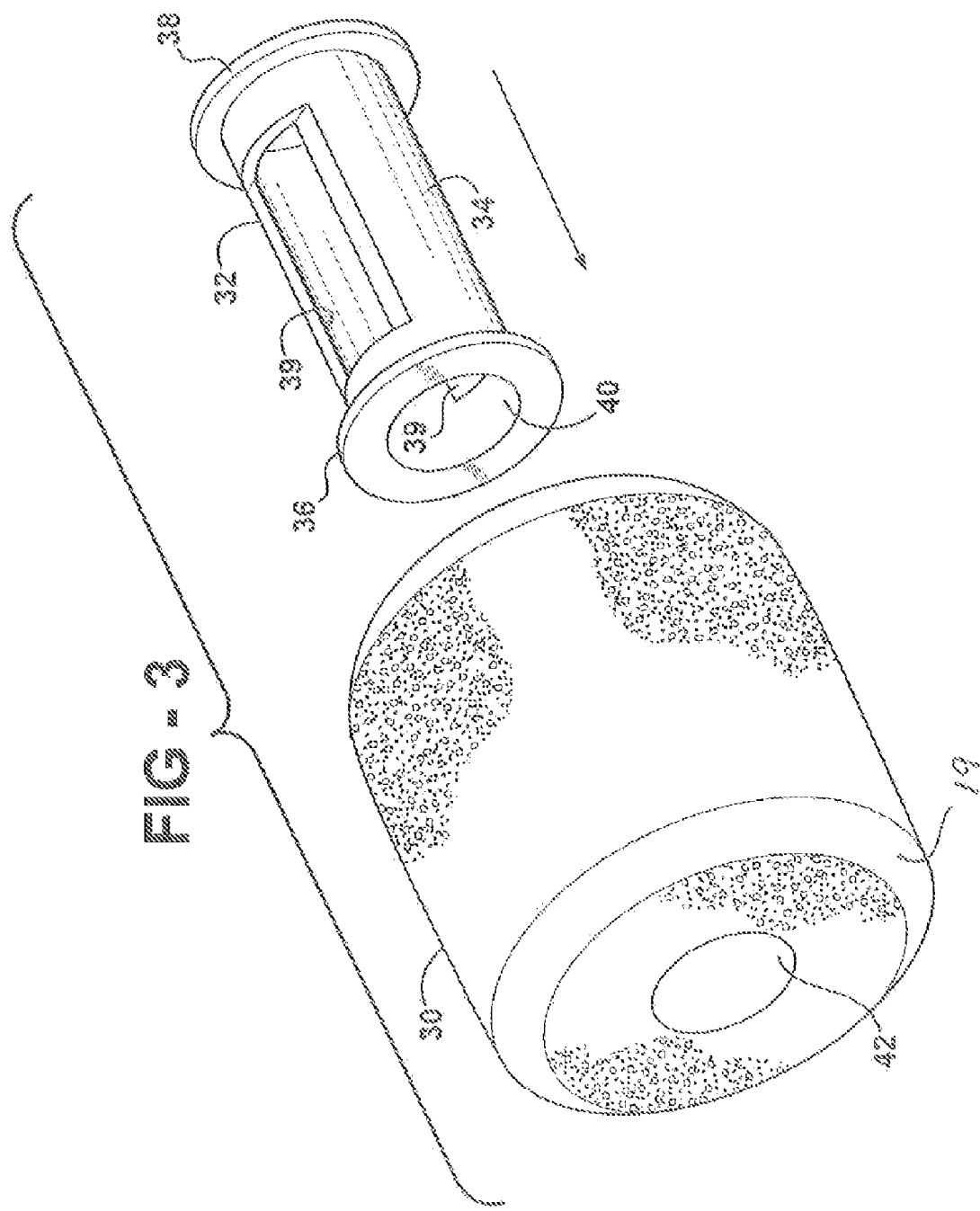
FIG. 3 is an exploded view of an applicator element showing the foam roller removed from a plastic hub.
Figure 4:
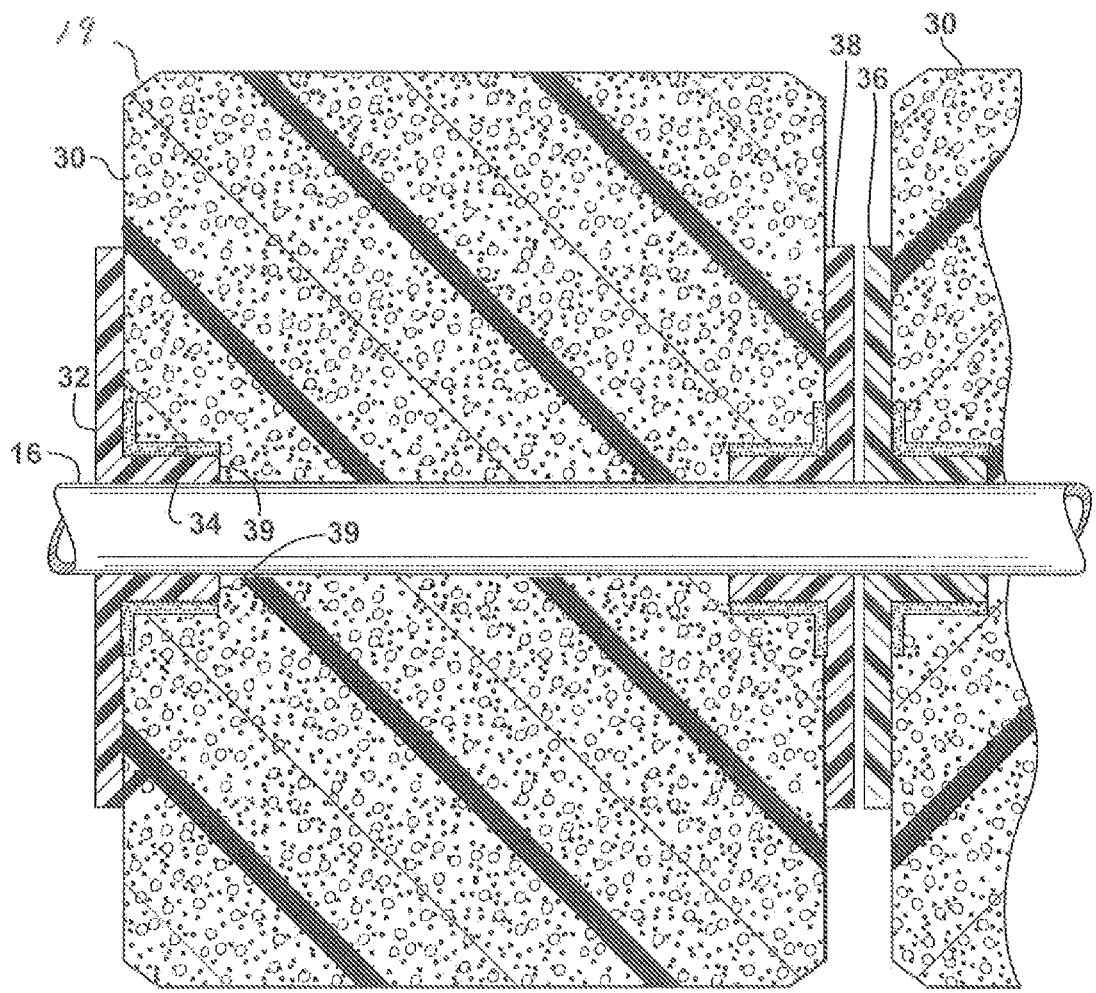
FIG. 4 is a cross-section of an assembled applicator element.
Figure 5:
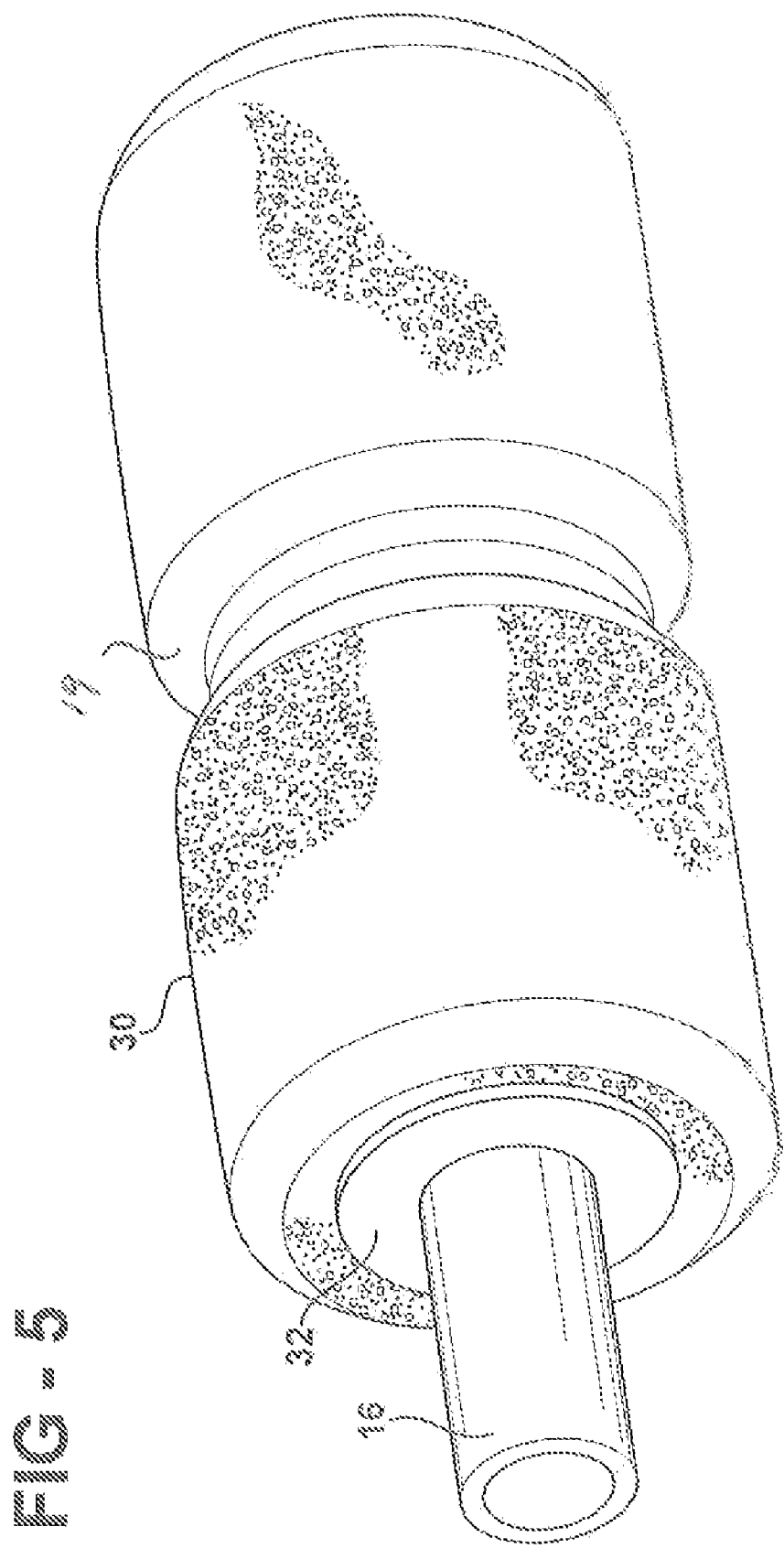
FIG. 5 is a perspective view of a portion of the system of FIG. 1 showing a guide bar.

Individual tire dressing dispenser nozzles 28*a*-28*e* are disposed above the outer circumferential surfaces of the elements 14*a*-14*e* as shown in FIG. 2 and are connected to a source 30 of tire dressing by means of one or more suitable valves. The elements 14*a*-14*e* are mounted on shaft 16 so that they can rotate in unison with shaft 16 and also rotate individually relative to the shaft 16 as well as relative to one another.

While the system 10 shown in FIGS. 1 and 2 is made up of five elements 14*a*-14*e*, it is to be understood that a practical system is approximately seven feet in overall length to ensure full tire coverage and, therefore, may include twelve or more elements 14 of about six inches in width, each.

Each element 14 comprises a polyurethane foam roller 30 mounted with adhesive on a spool-shaped plastic hub 32 having a central barrel 34 between end flanges 36 and 38. Each roller has a material density of about 2 lbs. per cubic foot and a spongy consistency. Hub 32 has a through-bore 40 which fits on shaft 16 and allows free rotation of the hub 32 relative to the shaft. Two windows 39 are formed in the barrel 34 to open the bore 40. Foam roller 30 is about six to eight inches in both width and outer diameter and fits snugly between the end flanges 36 and 38. A center bore 42 is sized with an internal diameter at least one-quarter inch less than the outer diameter of hub 32 such that the foam material protrudes through the windows 39 into contact with the shaft 16 when the element 14 is mounted on the shaft. The rollers 30 have beveled edges 19 as shown. This has been found to reduce damage to the roller material due to tire contact.

But for the foam material of the roller 30 protruding through the windows 39, the hub 32 would have little friction relative to shaft 16 and would rotate freely thereon. The foam material bulging through windows 39, however, adds friction such that the rotation of shaft 16 produced by actuator 22 also rotates the elements 14*a*-14*e* unless they are impeded by an outside force.

When the hubs are placed in side-by-side abutting relationship, the outside faces of the flange 36 and 38 act as thrust bearings allowing one element 14 to rotate relative to its neighbors as necessary.

The shaft 16 is positioned such that the bottoms of the rollers are about three inches above the conveyor floor. This allows the rollers to clear the conveyor dollies and also positions the rollers correctly on the tire being treated.

In operation, the selection of a wheel dressing application option by a customer is noted by the attendant who causes the bracket 18 along with the tire dressing applicator elements 14 to be brought up into proximity with the path 12 just prior to the approach of the vehicle. The valves connecting source 31 to dispenser 28 are operated to dispense dressing through the nozzles 28 onto the upper circumferential surfaces of the rollers 30. Thereafter, the actuator 22 is operated to rotate the shaft 16 and rollers 30 in unison approximately 90°. It is good practice, in advance of a vehicle, to operate the actuator 22 and the dispensers 28 a number of times to fully load the rollers 30 with dressing. This may be done at the beginning of a procession of vehicles and from time to time during the day to keep a fresh load of tire dressing on the applicator rollers at all times. As the tire of the approaching vehicle engages the rollers, the first action of engagement will be such as to rotate the first roller 30 relative to the shaft 16 in a downward direction. This downward rotation continues or progresses along the rollers 30 from right to left as shown in FIG. 1 until such time as the back end of the tire begins to engage the rollers 30. That relative motion will then be in the upward direction and therefore the closest or left-hand most roller 30 shown in FIG. 1 may be in the process of rotating downwardly relative to the shaft 16 while the rearmost roller 30 is being rotated upwardly by the diametrically opposite portion of the sidewall with which the roller surface is engaged.

After the tire has fully disengaged from the elements 14, the parallelogram system may be operated to withdraw the bracket 18 away from the path 12 until another customer selects this particular option.

The system is preferably made in such a way as to make it easy to disengage the shaft 16 from the support bracket 18 for the purpose of replacing the elements 14 as needed. The shaft 16 may be made of steel or polycarbonate or other suitable rigid tubular material such that the rollers 14 can simply slide onto and off of the shaft for purposes of construction and/or replacement. As can be seen, there is no need for a complicated internal cavity or nozzle system for applying tire dressing to the rollers 14 as is found in the prior art devices. While multiple rollers are shown, it is to be understood that a single, longer roller can also be used if desired.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tire dressing applicator comprising:
   a plurality of toroidal foam rollers each having an outer circumferential surface, said rollers being arranged in axially adjacent relationship on a support shaft;
   said rollers being frictionally mounted on said shaft such that the rollers are independently rotatable around said shaft as well as rotatable in unison with said shaft;
   an actuator connected to incrementally rotate said shaft; and
   means for dispensing tire dressing onto said circumferential surfaces for application to a tire sidewall.

2. An applicator as defined in claim 1 wherein said rollers are made of a low-density non-recticulated plastic material.

3. An applicator as defined in claim 1 wherein each roller is mounted on a spool-like hub.

4. An applicator as defined in claim 3 wherein each hub has end flanges.

5. An applicator as defined in claim 1 wherein said actuator comprises a one-way drive means for incrementally rotating the shaft in one direction only.

6. An applicator as defined in claim 1 wherein each of the rollers has at least one beveled edge.

7. An applicator as defined in claim 1 further including means for bringing the plurality of rollers into position adjacent a tire travel path to engage the sidewall of a tire in said path on command.

\* \* \* \* \*